United States Patent
Biswas et al.

(10) Patent No.: US 7,518,987 B2
(45) Date of Patent: Apr. 14, 2009

(54) MECHANISMS FOR PROVIDING CONNECTIVITY IN NAT REDUNDANT/FAIL-OVER SCENARIOS IN UNSHARED ADDRESS-SPACE

(75) Inventors: Kaushik P. Biswas, San Jose, CA (US); Senthil M. Sivakumar, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 598 days.

(21) Appl. No.: 11/189,478

(22) Filed: Jul. 25, 2005

(65) Prior Publication Data

US 2007/0019540 A1 Jan. 25, 2007

(51) Int. Cl.
- G06F 11/00 (2006.01)
- G06F 15/16 (2006.01)
- G01R 31/08 (2006.01)

(52) U.S. Cl. .................... 370/221; 370/225; 709/245
(58) Field of Classification Search ............... None
See application file for complete search history.

(56) References Cited

U.S. PATENT DOCUMENTS

| | | | |
|---|---|---|---|
| 6,223,149 B1* | 4/2001 | Margulis et al. | 703/27 |
| 6,295,276 B1* | 9/2001 | Datta et al. | 370/218 |
| 6,731,642 B1* | 5/2004 | Borella et al. | 370/401 |
| 6,795,705 B1* | 9/2004 | Warrier et al. | 455/435.1 |
| 6,888,837 B1* | 5/2005 | Cunningham et al. | 370/401 |
| 6,993,595 B1* | 1/2006 | Luptowski et al. | 709/245 |
| 7,356,026 B2* | 4/2008 | Scott et al. | 370/389 |
| 7,388,829 B2* | 6/2008 | Sivakumar et al. | 370/218 |
| 7,461,290 B1* | 12/2008 | Reynolds et al. | 714/4 |
| 2003/0185151 A1* | 10/2003 | Kurosawa et al. | 370/219 |
| 2004/0066749 A1* | 4/2004 | Watanabe | 370/242 |
| 2006/0182100 A1* | 8/2006 | Li et al. | 370/389 |

OTHER PUBLICATIONS

J. Rosenberg, et al., "SIP: Session Initiation Protocol", Jun. 2002, RFC 3261. Copyright The Internet Society (2002). pp. 1-225.

* cited by examiner

Primary Examiner—Chi H. Pham
Assistant Examiner—Warner Wong
(74) Attorney, Agent, or Firm—Weaver Austin Villeneuve & Sampson LLP (57) ABSTRACT

Disclosed are methods and apparatus for facilitating reliable session based communication with a local host via a subnet of redundant network devices that also implement network address translation (NAT) or the like. In general, embodiments of the present invention include mechanisms for reestablishing access to a local host after the local host's active network device has failed and been replaced by a new active network device with an address space that differs from the failed network device. In this invention, the network devices associated with the same local host also implement NAT, or the like. In brief, for each of its associated local hosts, the new active network device causes an address server to be updated with a new public address that is assigned from its address space to the local host. This update allows other remote hosts access to the local hosts by obtaining the updated address information from the address server. Communication sessions that were established prior to the failing active network device may also be retained by the new active network device. In this aspect, for each ongoing particular session between a remote host and a local host of the new active network device, the new active network device updates the remote host with a new public address assigned to local host for use in the particular session.

15 Claims, 4 Drawing Sheets

MECHANISMS FOR PROVIDING CONNECTIVITY IN NAT REDUNDANT/FAIL-OVER SCENARIOS IN UNSHARED ADDRESS-SPACE

BACKGROUND OF THE INVENTION

1. Field of the Invention

The present invention relates generally to communication between hosts in data networks, and more particularly to mechanisms for implementing redundancy based routing in an environment that uses network address translation (NAT) across different address spaces.

2. Background of the Invention

All devices connected to the Internet require an Internet protocol (IP) address to communicate with other Internet-attached devices. Typically, these address take the form of a 32-bit IP version 4 (IPv.4) or 128-bit IP version 6 (IPv.6) address assigned to an organization by the Internet Assigned Numbers Authority (IANA). The majority of internet-attached devices still communicate using older IPv.4 address due to the slow migration of internet service providers to IPv.6. One of the inherent limitations of IPv.4 is that the address space is relatively small compared to the total number of networked devices.

The network address translation (NAT) protocol developed as a solution to the shortage of addresses and the over-assignment of large blocks of IPv.4 addresses in the 1980s and 1990s. See K. Egevang and P. Francis, "The IP Network Address Translator (NAT)," RFC 1631, Cray Communications, NTT, May 1994, which is incorporated herein by reference for all purposes. NAT is based on one or more intermediate NAT device positioned between a local network and the public Internet. The local network does not use globally unique IP addresses. Blocks of IP addresses for use in local networks are defined in RFC 1631 for organizations to use only in their private networks. Thus, different local networks may use the same private IP addresses inside their individual local networks.

A device on a local network attempting to access a remote device on the public Internet is assigned a temporary unique public IP address for use outside the local network by the NAT device. The NAT device translates packets traveling between the local and remote devices, replacing the local hosts IP address with the temporary public, unique IP on communications sent from the local host to the remote host, and replacing the temporary public, unique IP address with the local hosts IP address on communications sent from a remote host to the local host. Once a communication between a local host and a remote host is completed, the temporary public, unique IP address is available for other local hosts for use in accessing computer resources outside their local networks.

In another technology area, virtual router protocols such as HSRP (Hot Standby Router Protocol) and VRRP (Virtual Router Redundancy Protocol) are typically used to provide a redundant router service on a subnet of redundant routers. The subnet of redundant routers are typically available to a local network of devices that are accessing outside hosts through the redundant routers. Specifically, the subnet of redundant routers are accessible via a virtual router having a particular address. In a setup procedure, two or more routers in the subnet typically participate in the election of an active router that is responsible for forwarding traffic sent to the virtual router. If that active router fails then another member of the group will take its place and continue to forward traffic sent to the virtual router.

NAT devices can also be configured with routing capabilities and serve as a redundant router group. Unfortunately, when some of the NAT devices utilize different public address spaces for their translations, the integration of redundant routing and NAT capabilities will fail to maintain connectivity under various conditions. In general, problems arise in the context of a communication protocol that utilizes a third party device or address server to facilitate communication between a remote host and a local host and the local hosts is associated with two NAT devices having differing public address spaces. In a first problem scenario, when a local host registers its address with an address server through a first NAT and such first NAT fails and a second NAT with a different address space takes over, remote hosts can no longer access the local host through its address information retained at the address server because the address information for the local host is no longer valid with the second NAT.

Second, when a communication session is set up between a remote host and a local host via a first NAT device that also serves as the active router in the redundant router group, this first NAT device may fail while such communication session is still in force. When the first NAT device fails and a second NAT device then takes over as the active router, the second NAT device is typically not aware of the public and private addresses used in the session that was established through the first NAT device prior to failure of the first NAT device. Thus, the addresses of packets transmitted to the remote host from the local host will not be properly translated by the second NAT device. The remote host will also not be able to reach the local host using the old public address assigned by the first NAT.

Accordingly, improved mechanisms for maintaining connectivity in an environment that implements redundant routing, NAT or the like, and a session based protocol are needed.

SUMMARY OF THE INVENTION

The present invention provides methods and apparatus for facilitating reliable session based communication with a local host via a subnet of redundant network devices that also implement network address translation (NAT) or the like. In general, embodiments of the present invention include mechanisms for reestablishing access to a local host after the local host's active network device has failed and been replaced by a new active network device with an address space that differs from the failed network device. In this invention, the network devices associated with the same local host also implement NAT, or the like. In brief, for each of its associated local hosts, the new active network device causes an address server to be updated with a new public address that is assigned from its address space to the local host. This update allows other remote hosts access to the local hosts by obtaining the updated address information from the address server. Communication sessions that were established prior to the failing active network device may also be retained by the new active network device. In this aspect, for each ongoing particular session between a remote host and a local host of the new active network device, the new active network device updates the remote host with a new public address assigned to local host for use in the particular session.

In one embodiment, a method of facilitating session based communications with a local host associated with a plurality of redundant network devices that also each implement network address translation is disclosed. The network devices includes an active network device that is adapted to use a first public address space and a standby network device that is adapted to use a second public address space. After the active network device fails and the standby network devices becomes a new active network device, The new active network device causes an address server to be updated with a new public address assigned by the new active network device from its second address space to the local host. This updating of the address server allows other remote hosts to access the local host by obtaining the new public address from the address server.

In a specific implementation, at the standby network device, session information for the local host is received from the active network device. The session information includes at least a portion of a payload, a source IP address, a source UDP port, a destination IP address, and a destination UDP port of a registration type message prior to translation being performed. The registration type message is used by the local host to register its presence on a network with the address server so that remote hosts may establish a session with the local host. The received session information of the registration type message is stored. The operation of causing the address server to be updated with the new public address assigned by the new active network device from its second address space to the local host is accomplished by (i) building a dummy registration type message based on the received session information of the registration type message and (ii) translating a private address specified in the dummy registration type message into a public address and forwarding the translated dummy registration message to the address server. In a further aspect, the registration type message and the dummy registration type message are each an SIP-REGISTER message that conforms to SIP (Session Initiation Protocol) and the address server is in the form of a Registrar that conforms to SIP.

In another embodiment, after the active network device fails and the standby network devices becomes a new active network device, for each ongoing particular session between a remote host and the local host, the remote host is updated with a new public address assigned by the new active network device from its second address space to the local host for use in the particular session. In a specific aspect, at the standby network device, session information for the local host is received from the active network device. The session information includes at least a portion of a payload, a source IP address, a source UDP port, a destination IP address, and a destination UDP port of a session setup or acknowledgement type message prior to translation being performed. The setup or acknowledgement type message contains address information for the local host that is being sent to the remote host so that the remote host can communicate with the local host. The session information for the session setup or acknowledgement type message is stored. Updating the remote host with a new public address assigned by the new active network device from its second address space to the local host for use in the particular session is accomplished by (i) building a dummy session setup or acknowledgement type message based on the stored session information for the session setup or acknowledgement type message and (ii) translating a private address specified in the dummy session setup or acknowledgement type message into a public address and forwarding the translated session setup or acknowledgement type message to the remote host.

In a specific implementation, the session setup or acknowledgement type message and the dummy session setup or acknowledgement type message are each an SIP-INVITE or 200 OK message that conforms to SIP (Session Initiation Protocol). In another implementation, the session setup or acknowledgement type message and the dummy session setup or acknowledgement type message are each a 225 SETUP message or a 225 CONNECT message that conforms to H.323.

In another embodiment, the invention pertains to a method of facilitating session based communications with a local host associated with a plurality of redundant network devices that also each implement network address translation. The network devices includes an active network device that is adapted to use a first public address space and a standby network device that is adapted to use a second public address space. When a registration type message is received in the active network device from a local host, wherein the registration type message is used by the local host to register its presence on a network with an address server so that remote hosts may establish a session with the local host, a private address specified in the registration message is translated into a public address and forwarding the translated registration message to the address server. When the registration type message is received in the active network device from the local host, the session information from the registration type message for the local host is also stored at the active network device and such session information is forwarded to the standby network device.

In a specific implementation, the translation includes translation of a source IP (Internet Protocol) address and/or a source UDP (User Datagram Protocol) port of the registration type message. In another aspect, the session information includes at least a portion of a payload, a source IP address, a source UDP port, a destination IP address, and a destination UDP port of the registration type message prior to translation being performed. In another aspect, the session information is only forwarded to the standby network device after a request for an update is made by the standby network device. In a further aspect, the session information is stored in as an entry in a Session Table that contains one or more entries for one or more sessions.

In a further aspect, forwarding the session information is accomplished by forwarding updates of one or more entries in the Session Table periodically to the standby network device and such forwarding is initiated by the active network device. In another feature, when a session setup or acknowledgement type message is received in the active network device from the local host, wherein the setup or acknowledgement type message contains a private address of the local host that is being sent to the remote host so that the remote host can communicate with the local host, the private address specified in the setup or acknowledgement message is translated into a public address and the translated setup or acknowledgement message is forwarded to the remote host. When the session setup or acknowledgement type message is received in the active network device from the local host, the session information for the local host from the received setup or acknowledgement type message is stored at the active network device and such session information is forwarded to the standby network device. The session information includes portions of the received setup or acknowledgement type message that are required for a valid setup or acknowledgement type message.

In another embodiment, the invention pertains to a computer system or apparatus operable to facilitate session based communications with a local host associated with a plurality of redundant network devices that also each implement network address translation. The computer system includes one or more processors and one or more memory. At least one of the memory and processors are adapted to provide at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The following description includes examples of a redundant router group implementing Hot Standby Router Protocol (HSRP). However, embodiments of the present invention may be implemented with any suitable redundant router protocol, besides HSRP. By way of example, the Virtual Router Redundancy Protocol (VRRP) may be used. Additionally, although embodiments of the present invention are described herein using a particular virtualization technique, any suitable mechanism may be used to set up and manage virtual networks (e.g., virtual local area networks or VLAN's). Additionally, the techniques of the present invention are described as being applied to the protocol SIP although they may be applied to any other type of session based communication protocol.

Figure 1:
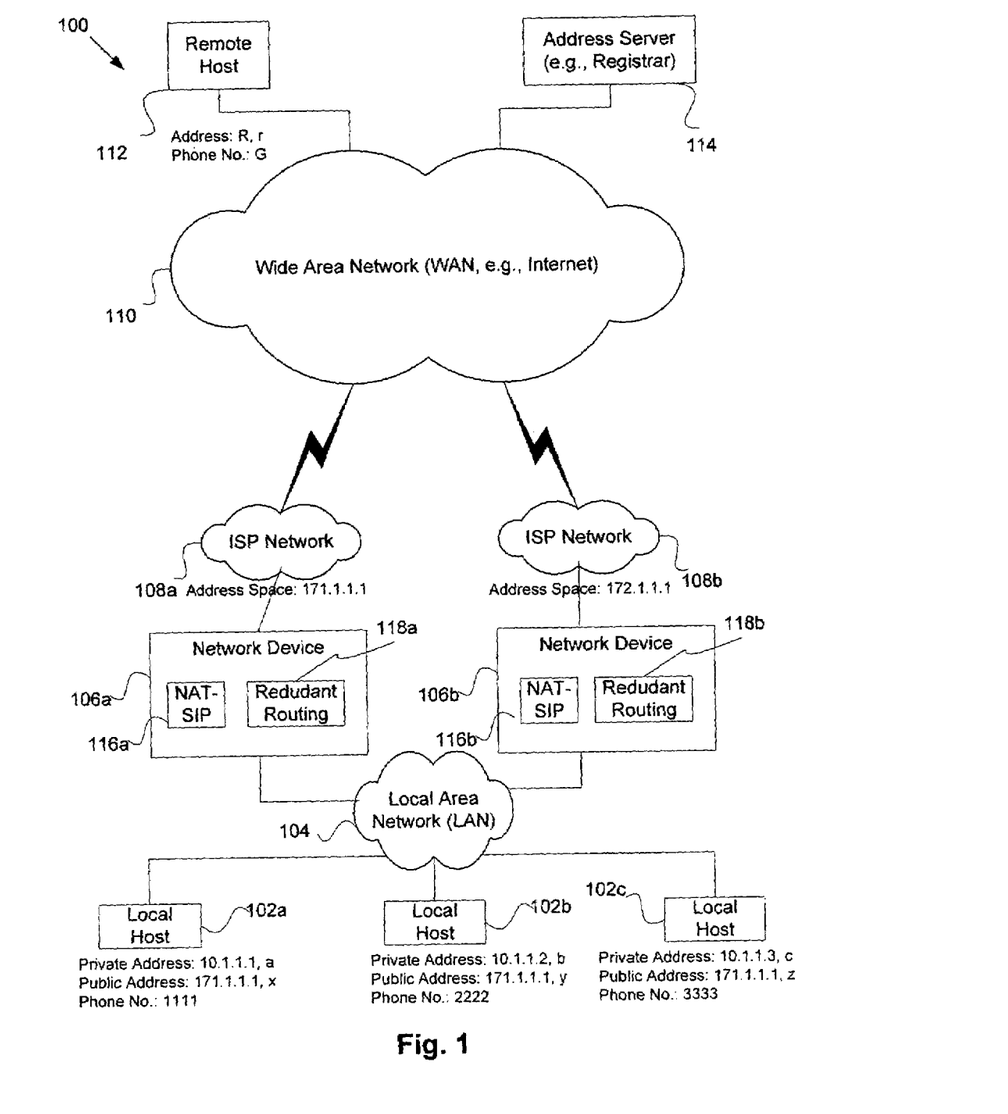
FIG. 1 shows a block diagram of network segment in which techniques of the present invention may be implemented.

FIG. 1 shows a block diagram of network segment 100 in which techniques of the present invention may be implemented. As shown, the network segment 100 includes a local area network (LAN) 104, network devices 106a and 106b, local hosts 102a~102c, and remote host 112. The network devices and/or hosts may communicate via any suitable link or set of links. The link(s) may be any suitable media such as coaxial cable, shielded and unshielded twisted pair wiring, fiber optic line, radio channels, and the like. The hosts will typically also reside in a LAN (local area network). This LAN may assume a variety of topologies, including ring, bus, star, etc. Further, these LANs may have different physical configurations such as token ring (IEEE 802.5), ethernet (IEEE 802.3), and fiber distributed data interface or "FDDI" (ANSI X3T9.5). As described further below, each host may also belong to a different VLAN (Virtual LAN).

Each of the local hosts may communicate with a remote host, e.g., remote host 112, via a group of redundant network devices 106 and a wide area network (WAN) 110, such as the Internet. Although not shown for all devices (e.g., remote host 112 and address server 114), each device typically communicates with other devices via one or more network devices, such as gateways and routers. A redundant group may include two or more network devices. In general, each network device in the redundant group includes a NAT-SIP mechanism 116 for translating between private and public addresses (or ports) for SIP messages and a Redundant Routing mechanism 118 for providing a redundant routing feature as described further below. Each network device may also be associated with a different Internet Service Providers (ISP) although some or all of the network devices in a particular network device group may be associated with the same or different ISP's. As shown, network device 106a is associated with ISP 108a, and network device 106b is associated with ISP 108b. Network device 106a and its ISP 108a utilize public address space 171.1.1.1, while network device 106b and its ISP 108b utilized public address space 172.1.1.1. This difference will become relevant during a failover event in the redundancy network device group as further described below.

Hosts (for example, workstations, users and/or data center servers) using the IP protocol generally are configured to utilize a default gateway to exit a local network and access remote networks and hosts. Therefore, each host has prior knowledge of the gateway's IP address which typically is a router or layer-3 switch IP address. Hosts are either statically configured with the IP address of the default gateway or are assigned the address through a configuration protocol (such as Cisco's Dynamic Host Configuration Protocol or DHCP) upon boot-up. In either case, the host uses the same default gateway IP address for all network traffic destined to exit the local network. In a network utilizing redundant routers, a host is configured with a particular IP address that that is assigned to the active router.

The general mechanism of HSRP will now be briefly described in relation to FIG. 1. At any one time, either of the network devices 108a and 108b assumes the state of active router, a condition requiring that it emulate a virtual router (not shown). Each host 102a~102c is configured to point to the virtual router, regardless of which real router (106a or 106b) is currently emulating the active router. Thus, when each host 102a~102c needs to send data packets outside of its LAN, it directs them to its virtual router. A virtual router in this invention is defined by virtual MAC layer and virtual network layer (e.g., IP) addresses which are shared by a group of routers running the protocol of this invention. The router selected by the protocol to be the active router (106a or 106b in this case) adopts these virtual MAC and virtual network layer addresses—possibly in addition to its own addresses—and thus receives and routes packets destined for the group's virtual router. In the router group shown of FIG. 1, there will be three pairs of addresses (each pair includes a MAC and a network layer address): one for router 106a, one for router 106b, and one for the group or virtual router (not shown).

One of the routers in the group (106a and 106b) assumes the state of standby (or backup) router. When the standby router detects that the active router has failed, it takes over as the active router by adopting the group's MAC and IP addresses. A new standby router may be automatically selected from among the other routers in the group when there are more than two routers in the group (not shown in the illustrated case). In the simple example provided in FIG. 1, if the router 106*a* is initially the active router, each host will send packets through router 106*a* because router 106*a* has adopted the MAC and network layer addresses of the virtual router. Further, if router 106*b* is the standby router, a failure by router 106*a* will cause router 106*a* to become the active router. After such failure, each host will continue sending data to the MAC and IP addresses of the virtual router even though that data is now transferred though a different router. It is important to recognize that any router in a standby group can assume the roles of standby or active router.

It should be recognized that the redundancy protocol used with this invention can in some circumstances be used to emulate virtual bridges (as opposed to virtual routers). For example, SRB ("source routing bridging") is a protocol allowing for multiple bridges operating in parallel. In implementing this invention in SRB, one bridge from a group would have to emulate a virtual bridge. For example, a virtual bridge number could be employed in much the same manner as the virtual IP addresses used for router standby groups.

Several detailed implementations of redundant routing mechanisms are further described in U.S. Pat. No. 5,473,599, issued 5 Dec. 1995, entitled STANDBY ROUTER PROTOCOL, and co-pending U.S. application Ser. No. 11/127,502, filed 11 May 2005, entitled MULTIPLE VIRTUAL ROUTER GROUP OPTIMIZATION, which patent and application are incorporated herein by reference in their entirety.

Referring back to FIG. 1, each local client device 102 attached to the local network 104 is assigned a unique local IP address using a private addressing scheme specific to the LAN. As shown, network device 102*a* is assigned private address "10.1.1.1, a" (IP or Internet Protocol address 10.1.1.1 and UDP or Universal Descriptor Protocol port "a"); network device 102*b* is assigned private address "10.1.1.2, b"; network device 102*c* is assigned private address "10.1.1.3, c".

NAT was not originally designed to be employed in local networks that had more than one entry or exit path to the Internet, nor was NAT designed to accommodate session-based protocols such as those based on the Session Initiation Protocol (SIP). See J. Rosenberg et al., "SIP: Session Initiation Protocol," RFC 3261, Dynamicsoft et al., June 2002, which document is incorporated herein by reference for all purposes.

Session-based protocols present a novel challenge to the effective use of NAT because they utilize an additional component, referred to here as an address server, e.g., 114. The address server is adapted to maintain records of the names and IP address of hosts that can use various session-based services. When a host is attached to a network, it contacts an address server and notifies the address server of its name and IP address. A first host seeking to connect to a second host queries the address server with the name of the second host, and the address server responds with the IP address of the second host. Because the NAT device after it transitions from a standby to an active role in conventional implementations does not communicate with the address server, global IP address changes made by a NAT device are typically not detected by the address server. As a result, any changes in the mapping between a local address and a global IP address by a NAT device can result in a loss of communications between two hosts using a session-based protocol for communications.

Embodiments of the present invention reliably maintain connectivity in the context of redundant routing and NAT capabilities and a session-based protocol, such as SIP. Although embodiments of the present invention are described in the context of the SIP session-based protocol, it should be readily apparent that SIP is merely one example of a session-based protocol and the present invention is in no way limited to an implementation of the SIP protocol. That is, embodiments of the present invention may be applied to any suitable session-based protocol.

Figure 2:
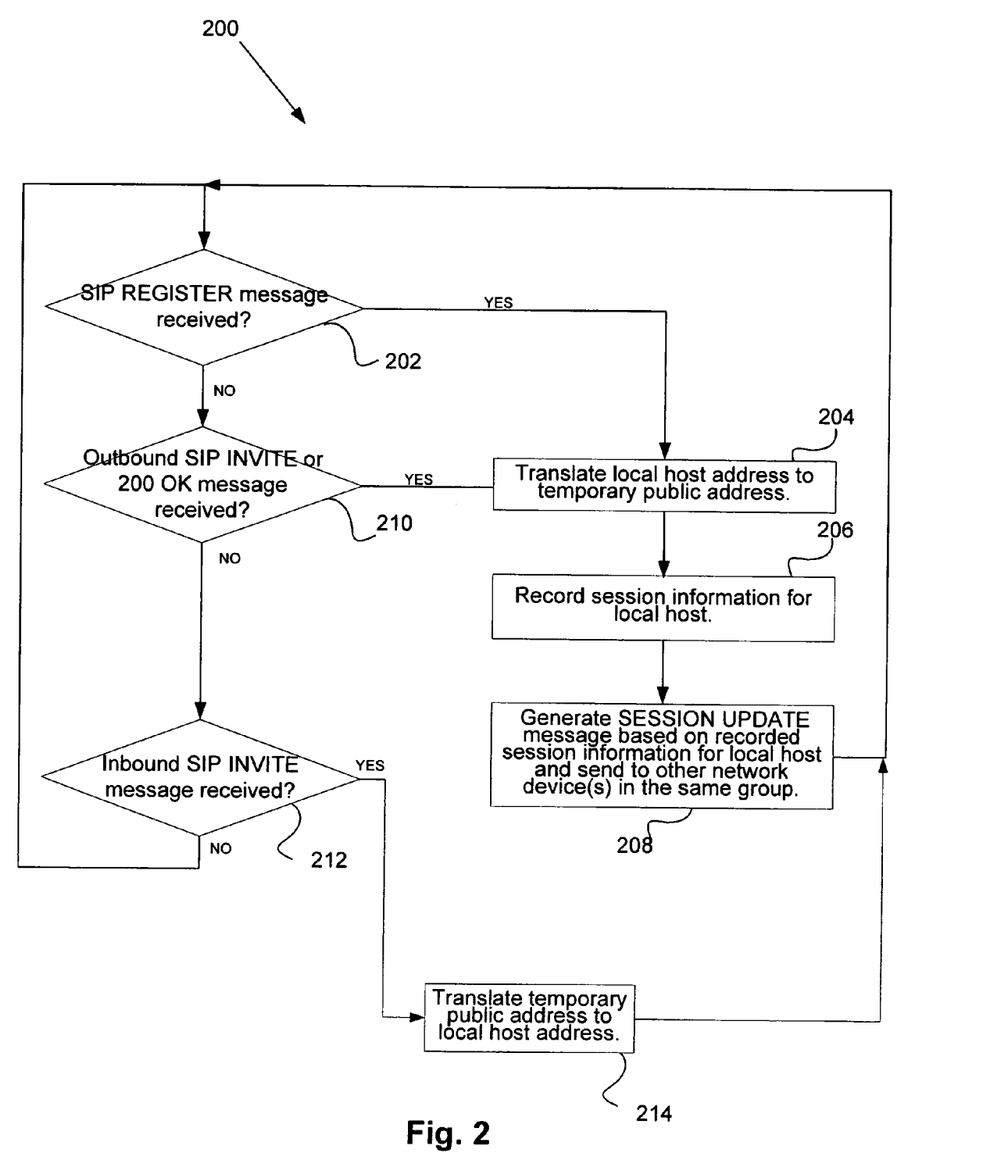
FIG. 2 is a flow chart illustrating a procedure for performing network address translation of session based data in an active network device that belongs to a redundant network device or router group in accordance with one embodiment of the present invention.
Figure 3:
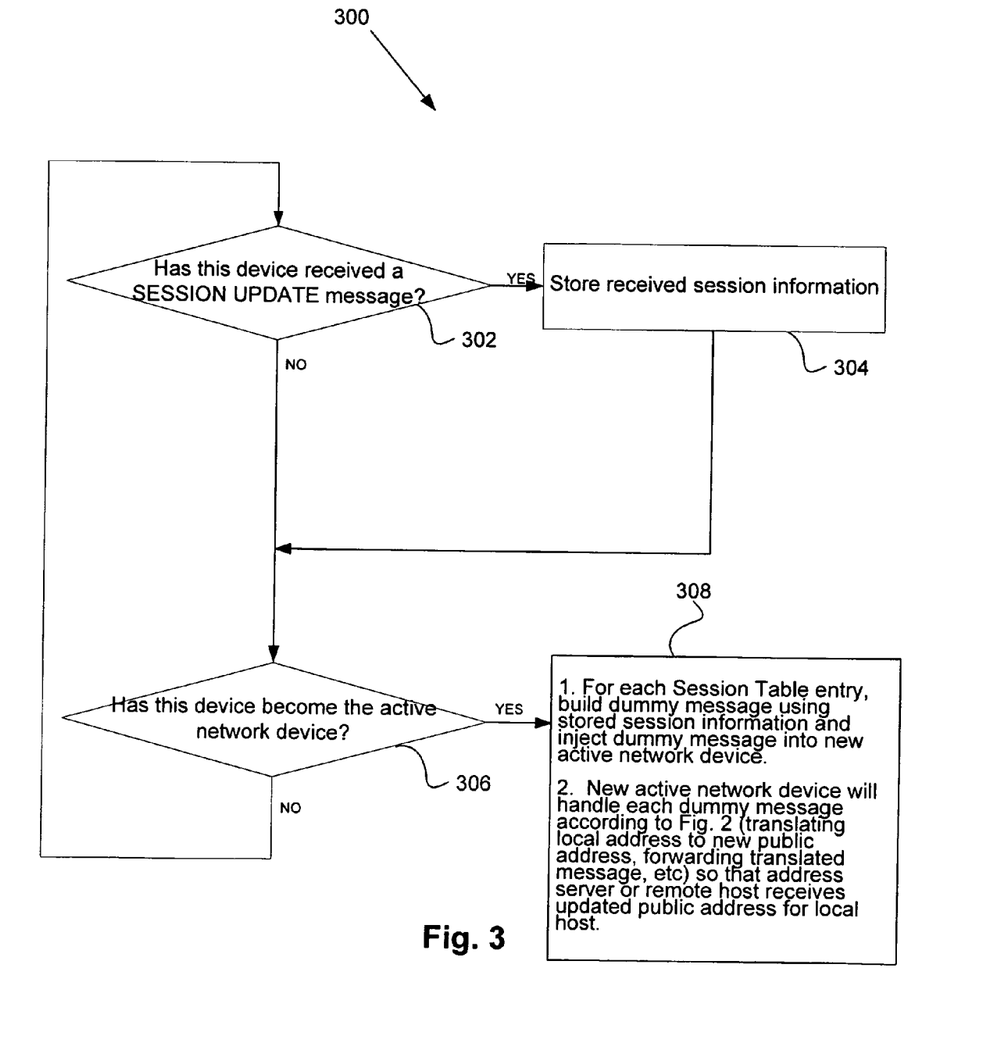
FIG. 3 is a process flow diagram showing a process implemented by a backup or standby network device for retaining connectivity with its local hosts in accordance with one embodiment of the present invention.

Two events or states in this invention are detailed in the flow charts of FIGS. 2 and 3. The first of these involves an active network device's operation. The second involves a standby router's operation, including taking over for an active router which has left its redundancy group for some reason. It should be understood that these flow diagrams as well as the others presented herein are provided as convenient representations to aid in understanding the network devices used in this invention. Some of the flow diagrams are organized in a manner that could imply that the system checks for certain actions by event loops or polling. No such limitation is intended. Thus, the process flow charts presented herein should not be read to imply that the system necessarily checks for events in the order listed.

FIG. 2 is a flow chart illustrating a procedure 200 for performing network address translation of session based data in a first network device that belongs to a redundant network device or router group in accordance with one embodiment of the present invention. This procedure is performed by the active router of the router group. For illustration purposes, network device 106*a* is initially assigned as the active router. Initially in block 202, the active router 106*a* checks whether an SIP REGISTER message has been received. In SIP, the SIP REGISTER message is used to by a host to register its presence on a network with an address server. Of course, the active router may check for any other suitable type of initial registration message, wherein the message format depends on the particular session-based protocol being used. An SIP REGISTER message (or other type of registration message) is always an outbound message with respect to the sender's active router. For example, host 102*a* sends an SIP REGISTER message to address server 114 via network device 106*a*.

If an SIP REGISTER message is received, the active router translates the private, local address specified in the message into a temporary public addresses in operation 204. The translated SIP REGISTER message is then forwarded to the address server. The particular locations of the address fields in a registration type message to be translated depend on the particular protocol being implemented. In the SIP REGISTER message example, the private source address is located in both the IP header and the SIP Contact field, and the network device translates both of these addresses into a public address. In the current example of FIG. 1, active network device 106*a* translates the private address "10.1.1.1, a" (where 10.1.1.1 is the private IP source address and "a" is the private source port) into public address "171.1.1.1, x" (where "171.1.1.1 is the public IP source address and "x" is the public source port).

This address translation process may include translation of the source IP address and/or the source port. For the many address translations that a network device may perform for its local hosts, the same public IP address and different port values may be assigned to different local hosts; different IP addresses and the same port may be assigned to different local hosts; or different IP addresses and different ports may be assigned to different local hosts.

When a register type message is outbound from a local host, the gateway network device creates a pinhole for a binding generated for such message so that other subsequent messages may then be received by the registering host from an outside device. In one implementation, during translation the receiving network device also records bindings between the private and public address pairs for the current example into a NAT Table as illustrated in Table 1. When a subsequent packet is received into the network device, the contents of the NAT Table may be later searched (for an address matching the source address of the packet for an outbound packet and for an address matching the destination address for an inbound packet). When a match is found, the corresponding binding is then used to translate the local host's address in the packet.

TABLE 1

NAT Table

| Private IP Address | Private Port | Public IP Address | Public Port |
|---|---|---|---|
| 10.1.1.1 | a | 171.1.1.1 | x |

In operation 206, the session information for the local host is recorded, for example, in a session-based data structure. In one implementation, the session information for the current example is recorded in a Session Table as illustrated in Table 2:

TABLE 2

Session Table

| Source IP Address | Source Port | Destination IP Address | Destination Port | Message Info. |
|---|---|---|---|---|
| 10.1.1.1 | a | R | r | SIP-Register Msg. Info. |

In this example, the session information includes the local hosts private source address (10.1.1.1) and port (a), the destination host's address (R) and port (r), and Message Info (SIP-Register Message Information).

The Message Information includes any suitable portion of the received SIP REGISTER message that is necessary to trigger address server to recognize and retain the address information of the sending host. In one implementation, at least a portion of the payload of the SIP REGISTER message is stored, along with the local address and port and remote address and port. In preferred embodiments, the entire payload is stored.

A SESSION UPDATE message is also generated based on the recorded session information by the first network device 106a and sent to other network devices in the same redundancy group, such as to network device 106b, in operation 208. This SESSION UPDATE message can contain updates to the first network device's Session Table or the entire Session Table. The other network devices will update their own Session Tables with the received SESSION UPDATE message. The procedure then repeats operation 202 and it is again determined whether an SIP REGISTER message has been received.

Updated session information may be communicated from the active network device to other network devices in any suitable manner and the above described technique is merely exemplary. In one implementation, a TCP session (or any other type of communication session) is open between other network devices in a particular group. The active router may then periodically transmit to the backup router updated information (herein referred to as SESSION UPDATE messages) relating to any changes, updates or modifications made to the primary router's Message Table. In one embodiment, transmission of SESSION UPDATE messages may by periodically initiated by the active router generating the SESSION UPDATE message information. Thus, for example, the backup router may be configured to operate in a listening mode in order to receive information transmitted from the active router relating to modifications and/or updates of entries in the active Session Table. In an alternate embodiment, transmission of SESSION UPDATE messages may be initiated in response to a request from another network device, such as, for example, the backup router. Thus, for example, if the active network device receives a request from the backup network device for a dump of the active Session Table, the active device complies by sending one or more SESSION UPDATE messages to the backup network device which include information relating to the current entries in the active Session Table. This may happen, for example, after initialization or restart of the backup network device. The backup router may then update its Session Table using the SESSION UPDATE message information received from the active device. In this way, synchronization of information contained in each of the primary and backup Session Tables may be achieved. In the current example, after network device 106a receives SIP REGISTER message, the Session Tables of both network devices 106a and 106b will look like Table 2 above.

After translation, the SIP REGISTER message is delivered to the address server 114 (e.g., an SIP Proxy-Server/Registrar). The address server 114 then records the connection information, such as the Phone No. 1111 and corresponding public address "171.1.1.1, x", for the registering host 102a. This connection information may then be used by other hosts to contact the registered host. That is, a remote host may have knowledge of the Phone No. 1111 for host 102a and then use this Phone No. to retrieve the address 171.1.1.1 for host 102a from address server 114.

If a SIP REGISTER message is not detected, the network device then determines whether an outbound SIP INVITE or 200 OK message has been received in operation 210. This might occur when local host 102a sends an SIP-INVITE message to setup a call with the remote host 112, or the local host 102a sends a 200 OK message to a remote host in response to the remote host sending an SIP-INVITE message to setup a call with the local host. In the current example, an SIP INVITE (or 200 OK) message that is sent from a host, such as host 102a, on the local network 104 to a remote host, such as 112, is received by active network device 106a. (The SIP INVITE messages are typically sent a remote host via the address server or registrar which then routes the message to the appropriate host). The SIP INVITE message is generally used by a host to setup a connection between itself and another host using SIP. The SIP INVITE or 200 OK message will contain a SDP (session descriptor protocol) that specifies the local host's local address (i.e., IP address and port), the invitee host's public address, and SIP-Invite message information.

If an outbound SIP INVITE message or 200 OK is detected, the network device translates the local address into a temporary public address (which may or may not be the same as the public address used for the REGISTER message), records the SIP-SDP message information, and generates a SESSION UPDATE message that is sent to other network devices in the same group in operations 204, 206, and 208 as described above. The Session Tables of both network devices 106a and 106b will now look like Table 3:

TABLE 3

Session Table

| Source IP Address | Source Port | Destination IP Address | Destination Port | Message Info. |
|---|---|---|---|---|
| 10.1.1.1 | a | R | r | SIP-Register-Msg. Info. |
| 10.1.1.1 | a | R | r | SIP-SDP Msg. Info. |

In this example, the added session information includes the local hosts private source address (10.1.1.1) and port (a), the destination host's address (R) and port (r), and Message Information for the received message (SIP-SDP Message Information).

The Message Information includes any suitable portion of the received SIP INVITE or 200 OK message that is necessary to trigger the receiving remote to recognize and retain the address information of the sending host. In other words, the session information includes portions of the SIP INVITE or 200 OK message that are required for a valid setup or acknowledgement message. In one implementation, at least a portion of the payload of the SIP INVITE or 200 OK message is stored, along with the local address and port and remote address and port.

If an outbound SIP INVITE or 200 OK message is not detected, the network device checks whether an inbound SIP INVITE message has been received in operation 212. If an inbound SIP INVITE message is not detected, the network device also proceeds to block 202 to await receipt of a new message. In some cases, the remote host, such as host 112, will wish to call a local host, such as host 102a. The remote host 112 will then send an SIP INVITE message to local host 102a. When this inbound SIP INVITE message is detected by the active network device 106a, the network device 106a translates the temporary public destination address into the corresponding private address in operation 214. The procedure then waits for another SIP message in operations 202 and 210.

In this case, it is likely that the active network device 106a will receive an acknowledgement message (e.g., a 200 OK message) from the local host in response to the inbound SIP-INVITE message. In the current SIP example, 200 OK message will contain the SIP message information for the local host (e.g., in the form of SDP). When the 200 OK message is received, operations 204, 206, and 208 are performed as described above and the Session Tables of both network device 106a and 106b will look the same, e.g., as shown in Table 3.

After two hosts have exchanged INVITE and OK messages, each of the hosts may then communicate directly with the other host using the retained addresses of the other host. Additionally, after a local host has registered with an address server, any host may then contact the local host by obtaining the local host's address information from the address server. Embodiments of the present invention allow access to the local host after the local host's gateway redundancy group of network routers undergoes a transition in which an active router fails and a standby router transitions to an active state.

FIG. 3 is a process flow diagram showing a process for retaining connectivity with its local hosts implemented by a backup or standby network device in accordance with one embodiment of the present invention. The backup or standby network device is adapted to take over the NAT and/or network routing operations of a primary network device when the primary device is unable, due to network problems or a fault with the primary device, to route and translate data.

Initially, the standby network device determines whether a SESSION UPDATE message has been received from the currently active network device in operation 302. When a SESSION UPDATE message is received, the backup or standby network device stores the session information contained in the received SESSION UPDATE message in operation 302. For example, the network device 106b receives the entries of the Session Table 3 from active network device 106b after local host 102a has registered with the address server and a call has been set up between the remote host 112 and the local host 102a.

In block 306, the secondary or backup network device checks whether is has become the active network device. This determination may occur in any suitable manner. For example, the standby network device may check a status flag which indicates whether it is an active or standby or listening router. In other embodiments, when a network device transitions from a standby to an active state, the operations of block 308 may be triggered by such transition.

If the standby network device is now active, the new active device performs several procedures illustrated in operation 308. For each Session Table entry, the new active device builds a dummy message using the stored session information and injects this dummy message into itself so that the dummy message is processed as a received message. In one embodiment, the dummy message is sent to the new active network device's input queue. In the example, of Table 3, a dummy REGISTER message and a dummy SDP type message is generated and injected into the new active network router.

This injection procedure causes the new active network device to handle each dummy message according to the procedures of FIG. 2. When the dummy REGISTER message is injected, the local host's private address "10.1.1.1, a" in the dummy REGISTER message is translated to a new public address "172.1.1.1, x". The translated REGISTER message is then forward to the address server, which updates its database with the new address "172.1.1.1, x" of the local host. Since the new active network device uses a dummy REGISTER message to spoof a REGISTER message sent by the local host, the address server handles the dummy REGISTER message as if it is a REGISTER message sent by the local host.

The new active network device uses an SDP type message to spoof an SIP-INVITE or 200 OK message sent by the local host. When the new active network device injects itself with a dummy SDP type message, the new active network device handles it like an SIP-INVITE or 200 OK message sent by the local host. Thus, the network device translates the private address of the local host in the SDP type message into a new public address, e.g., 172.1.1.1. This translated SDP type message is then forwarded to the remote host (via the address server) and the remote host also updates its public address that it will use for the local host.

For both types of dummy messages, the new active network device also stores session information for the local host and forwards this session information to the new standby router. This way, the new standby router can reliably maintain communication with the local hosts by building dummy messages again based based on the new message formed by the new active network device. This last operation is optional and may be unnecessary since the new standby router will already have session information for its previously established calls and registrations which it already shared with the old standby router prior to it transitioning from active to inactive.

The techniques for updating a local host's assigned public address during a transition between network devices may be applied to any suitable protocol. That is, a dummy message can be formed to mimic any suitable address updating type message. In the SIP example, an INVITE or 200 OK message is created and injected into the new active network device. In an H.323 protocol example, a 225 Setup Message or a 225 Connect Message may be created and injected into the new active network device. This message is then translated by the new active network device sent to the remote host via a gatekeeper so that both the remote host and gatekeeper can update their databases with the local host's new public address.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 4:
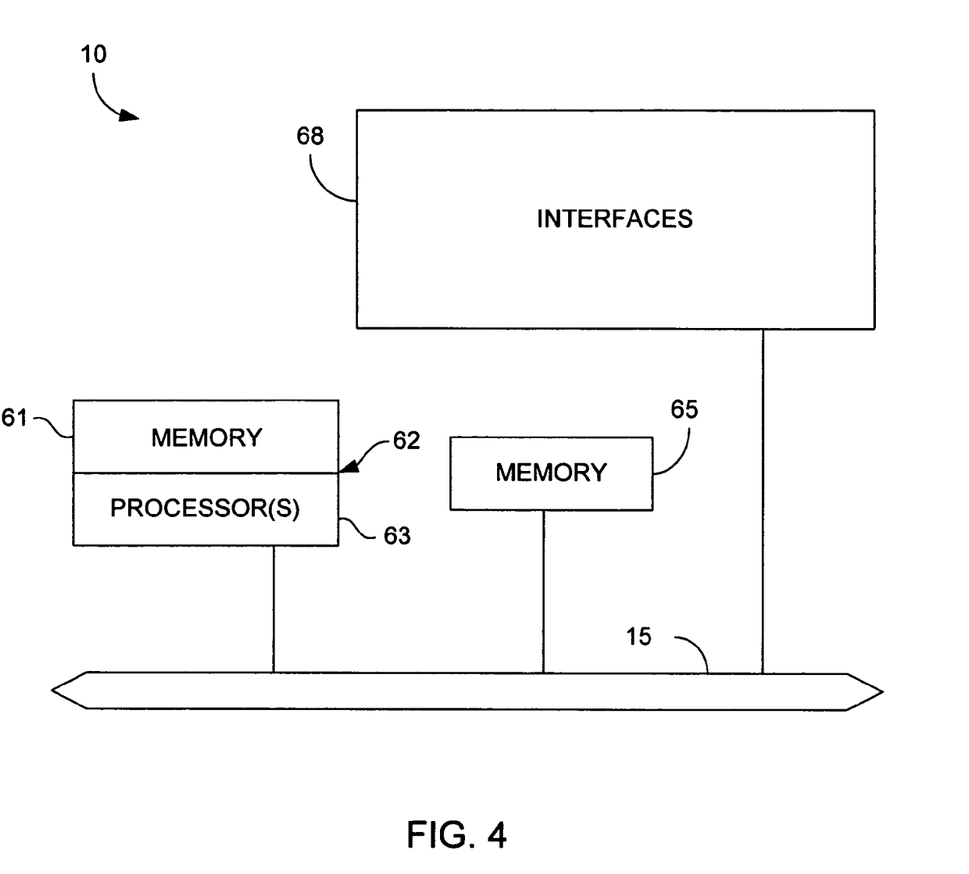
FIG. 4 is a block diagram of a router that may be used to implement embodiments of this invention.

Referring now to FIG. 4, a router 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such router tasks as routing table computations and network management. It may also be responsible for calculating a route metric and/or comparing two route metrics to determine which has higher priority. It preferably accomplishes all these functions under the control of software including an operating system (for example, the Internetwork Operating System (IOS200) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received messages, a NAT Table, a Session Table, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Get translated address and use that in payload. Therefore, the described embodiments should be taken as illustrative and not restrictive, and the invention should not be limited to the details given herein but should be defined by the following claims and their full scope of equivalents.

What is claimed is:

1. A method of facilitating session based communications with a local host associated with a plurality of redundant network devices that also each implement network address translation, wherein the network devices includes an active network device that is adapted to use a first public address space and a standby network device that is adapted to use a second public address space, the method comprising:

after the active network device fails and the standby network devices becomes a new active network device, causing an address server to be updated with a new public address assigned to the local host by the new active network device from its second address space, wherein the new public address is used by the new active network device to translate a private address of the local host that is used in data sent, via the new active network device, between the local host and other remote hosts, wherein this updating of the address server is caused by the new active network device and allows other remote hosts to access the local host by obtaining the new public address from the address server and then using the new public address in data sent from the other remote hosts to the local host via the new active network device, which translates such new public address into the private address of the local host.

2. A method as recited in claim 1, further comprising:

at the standby network device, receiving session information for the local host from the active network device, wherein the session information includes at least a portion of a payload, a source IP address that is a private address of the local host, a source UDP port, a destination IP address, and a destination UDP port of a registration type message prior to translation being performed on the private address of the local host into the new public address from the first public address space of the active network device, wherein the registration type message is used by the local host to register its presence on a network with the address server so that remote hosts may establish a session with the local host; and storing the received session information of the registration type message, wherein causing the address server to be updated with the new public address assigned to the local host by the new active network device from its second address space is accomplished by:

building a dummy registration type message based on the received session information of the registration type message; and translating the private address specified in the dummy registration type message into the new public address and forwarding the translated dummy registration message to the address server.

3. A method as recited in claim 2, wherein the registration type message and the dummy registration type message are each an SIP-REGISTER message that conforms to SIP (Session Initiation Protocol) and the address server is in the form of a Registrar that conforms to SIP.

4. A method as recited in claim 1, further comprising:

after the active network device fails and the standby network devices becomes a new active network device, for each ongoing particular session between a remote host and the local host, updating the remote host with the new public address assigned by the new active network device from its second address space to the local host for use in the particular session.

5. A method as recited in claim 4, further comprising for each session between the local host and each remote host:

at the standby network device, receiving session information for the local host from the active network device, wherein the session information includes at least a portion of a payload, a source IP address that is a private address of the local host, a source UDP port, a destination IP address, and a destination UDP port of a session setup or acknowledgement type message prior to translation being performed on the private address of the local host into the new public address from the first public address space of the active network device, wherein the setup or acknowledgement type message contains address information for the local host that is being sent to the each remote host so that the each remote host can communicate with the local host; and storing the session information for the session setup or acknowledgement type message, wherein updating the each remote host with the new public address assigned to the local host by the new active network device from its second address space for use in the particular session is accomplished by:

building a dummy session setup or acknowledgement type message based on the stored session information for the session setup or acknowledgement type message; and translating the private address specified in the dummy session setup or acknowledgement type message into the new public address and forwarding the translated session setup or acknowledgement type message to the each remote host.

6. A method as recited in claim 5, wherein the session setup or acknowledgement type message and the dummy session setup or acknowledgement type message are each an SIP-INVITE or 200 OK message that conforms to SIP (Session Initiation Protocol).

7. A method as recited in claim 5, wherein the session setup or acknowledgement type message and the dummy session setup or acknowledgement type message are each a 225 SETUP message or a 225 CONNECT message that conforms to H.323.

8. A network device operable to facilitate session based communications with a local host associated with a plurality of redundant network devices that also each implement network address translation, wherein the network devices includes an active network device that is adapted to use a first public address space and a standby network device that is adapted to use a second public address space, the network device being the standby network device and the network device comprising:

one or more processors;

one or more memory, wherein at least one of the processors and memory are configured for:

after the active network device fails and the standby network devices becomes a new active network device, causing an address server to be updated with a new public address assigned to the local host by the new active network device from its second address space, wherein the new public address is used by the new active network device to translate a private address of the local host that is used in data sent, via the new active network device, between the local host and other remote hosts, wherein this updating of the address server is caused by the new active network device and allows other remote hosts to access the local host by obtaining the new public address from the address server and then using the new public address in data sent from the other remote hosts to the local host via the new active network device, which translates such new public address into the private address of the local host.

9. A network device as recited in claim 8, wherein the at least one of the processors and memory are further configured for:
at the standby network device, receiving session information for the local host from the active network device, wherein the session information includes at least a portion of a payload, a source IP address that is a private address of the local host, a source UDP port, a destination IP address, and a destination UDP port of a registration type message prior to translation being performed on the private address of the local address into the new public address from the first public address space of the active network device, wherein the registration type message is used by the local host to register its presence on a network with the address server so that remote hosts may establish a session with the local host; and
storing the received session information of the registration type message,
wherein causing the address server to be updated with the new public address assigned by the new active network device from its second address space to the local host is accomplished by:
building a dummy registration type message based on the received session information of the registration type message; and
translating the private address specified in the dummy registration type message into the new public address and forwarding the translated dummy registration message to the address server.

10. A network device as recited in claim 9, wherein the registration type message and the dummy registration type message are each an SIP-REGISTER message that conforms to SIP (Session Initiation Protocol) and the address server is in the form of a Registrar that conforms to SIP.

11. A network device as recited in claim 8, wherein the at least one of the processors and memory are further configured for:
after the active network device fails and the standby network devices becomes a new active network device, for each ongoing particular session between a remote host and the local host, updating the remote host with the new public address assigned by the new active network device from its second address space to the local host for use in the particular session.

12. A network device as recited in claim 11, wherein the at least one of the processors and memory are further configured to perform the following operations for each session between the local host and each remote host:
at the standby network device, receiving session information for the local host from the active network device, wherein the session information includes at least a portion of a payload, a source IP address that is a private address of the local host, a source UDP port, a destination IP address, and a destination UDP port of a session setup or acknowledgement type message prior to translation being performed on the private address of the local host into the new public address from the first public address space of the active network device, wherein the setup or acknowledgement type message contains address information for the local host that is being sent to the each remote host so that the each remote host can communicate with the local host; and
storing the session information for the session setup or acknowledgement type message,
wherein updating the each remote host with the new public address assigned to the local host by the new active network device from its second address space for use in the particular session is accomplished by:
building a dummy session setup or acknowledgement type message based on the stored session information for the session setup or acknowledgement type message; and
translating the private address specified in the dummy session setup or acknowledgement type message into the new public address and forwarding the translated session setup or acknowledgement type message to the each remote host.

13. A network device as recited in claim 12, wherein the session setup or acknowledgement type message and the dummy session setup or acknowledgement type message are each an SIP-INVITE or 200 OK message that conforms to SIP (Session Initiation Protocol).

14. A network device as recited in claim 12, wherein the session setup or acknowledgement type message and the dummy session setup or acknowledgement type message are each a 225 SETUP message or a 225 CONNECT message that conforms to H.323.

15. An apparatus for facilitating session based communications with a local host associated with a plurality of redundant network devices that also each implement network address translation, wherein the network devices includes an active network device that is adapted to use a first public address space and a standby network device that is adapted to use a second public address space, the apparatus being the standby network device and comprising:
means for causing an address server to be updated with a new public address assigned to the local host by the new active network device from its second address space, wherein the new public address is used by the new active network device to translate a private address of the local host that is used in data sent, via the new active network device, between the local host and other remote hosts after the active network device fails and the standby network devices becomes a new active network device, wherein this updating of the address server is caused by the new active network device and allows other remote hosts to access the local host by obtaining the new public address from the address server and then using the new public address in data sent from the other remote hosts to the local host via the new active network device, which translates such new public address into the private address of the local host.

* * * * *